Nov. 11, 1947.   L. E. FARRELL   2,430,458
AUTOMATIC SCREW CONTROL
Filed Aug. 27, 1945

Inventor
Leo E. Farrell
By Liverance and
Van Antwerp
Attorneys

Patented Nov. 11, 1947

2,430,458

UNITED STATES PATENT OFFICE 2,430,458

AUTOMATIC SCREW CONTROL

Leo E. Farrell, South Haven, Mich., assignor to Titan Manufacturing Company, Grand Rapids, Mich., a partnership Application August 27, 1945, Serial No. 612,949

5 Claims. (Cl. 74—424.8)

This invention relates to an automatic screw control which in practice has been used in conjunction with clamps, but is of a more general application, for example may be used with vises and in various other analogous relations.

A primary object and purpose of the invention is to provide a control for a screw which permits a free longitudinal movement of a screw threaded rod through a nut through which it passes on turning the screw in one direction, but which on turning the screw in the opposite direction, engages the threads of the screw with interior part threads of the nut through which the screw passes, with a maintenance of such engagement during the turning of the screw in the last named direction or until it is reversed in turning movement. A further object of the invention is to provide means for causing a yielding pressure and, therefore, a frictional engagement of the screw with the passage of the nut through which it passes, to thereby insure the engagement with or disengagement from the interior screw threads of said nut on turning the screw in the prescribed directions, with an elimination of a separate manually operable means to accomplish such engagement or disengagement.

To these ends and to others directed to the production of a simple, durable, practical and efficient mechanism for accomplishing the ends sought I have made the present invention, which may be understood from the following description, taken in connection with the accompanying drawing, in which, Fig. 1 is an elevation of a clamp with which my invention is used.

Like reference characters refer to like parts in the different figures of the drawing.

Figure 3:
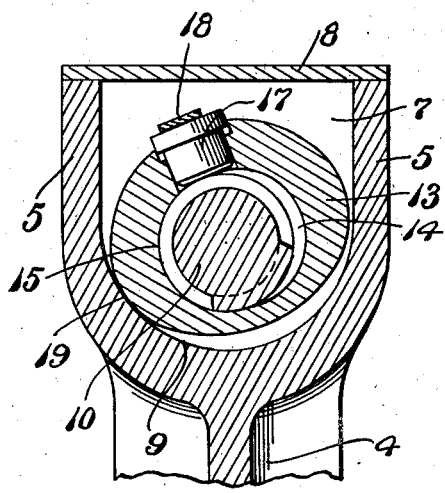
Figs. 3 and 4 are transverse vertical sections, substantially on the plane of line 3—3 of Fig. 2, looking in the direction indicated, and illustrating the two different positions of the nut relative to the screw, automatically obtained by turning the screw in opposite directions.
Figure 4:
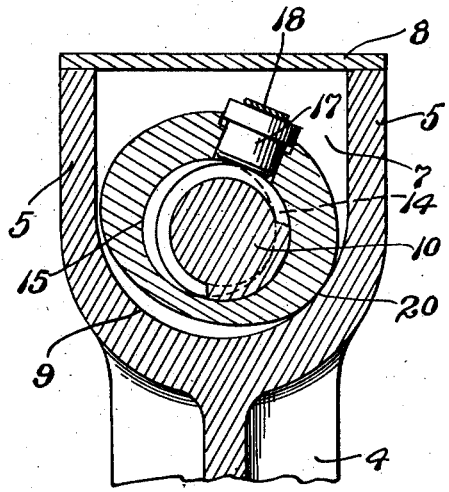
Figure 1:
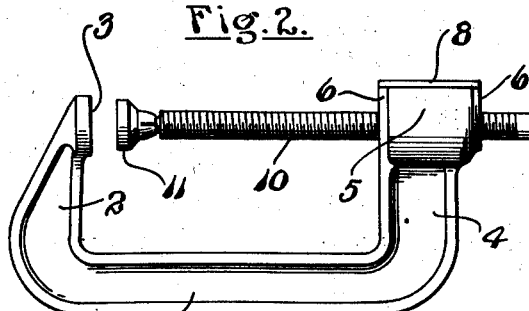

As shown in Fig. 1, the invention is applied to a clamp which is of a generally U-shape, having a side 1 with one arm 2 extending substantially at right angles therefrom at one end, said arm at its free end and inner side having a head with a face 3 against which one outer side of material to be clamped may be placed. The other arm 4 extends from the opposite end of the side 1, in the same direction as the arm 2, and at its free end is formed to provide a chamber between spaced apart sides 5 and ends 6, the chamber, indicated at 7 being closed by a cover plate 8 secured in place by screws or other equivalent fastening means. As shown in Figs. 3 and 4, the inner sides of the chamber walls 5 are parallel to each other and are connected at their inner ends by an arc indicated at 9 the diameter of which may be substantially the distance between the inner sides of the walls 5; though said curved or arcuate inner side or bottom of the chamber 7 is not specifically essential in connection with the invention, but may be widely varied.

The screw 10 comprises an elongated rod exteriorly threaded for the major portion of its length and, as in Fig. 1, equipped with a clamp head 11 at its inner end disposed in a position to come opposite the clamping face 3 previously described. Such head 11 preferably is connected to the screw 10 by a universal ball and socket connection. At the opposite or outer end of the screw threaded rod 10 a means for manually turning it is provided, shown as a transverse rod 12; but which, of course, may be a crank, hand wheel or other equivalent means.

Figure 2:
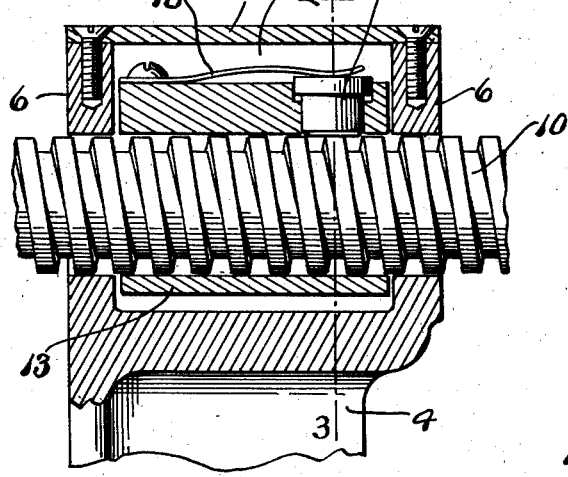
Fig. 2 is a longitudinal vertical section through the end of a clamp arm through which the screw passes.
Figure 5:
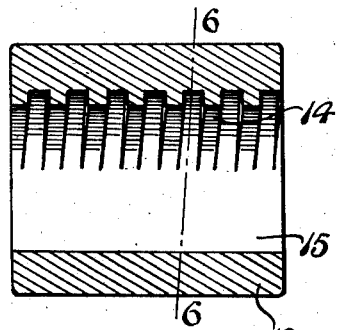
Fig. 5 is a horizontal section substantially on the plane of line 5—5 of Fig. 6.
Figure 6:
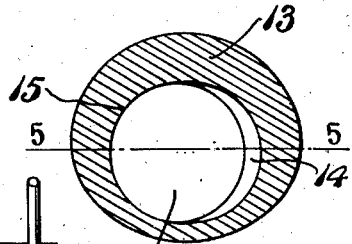
Fig. 6 is a vertical section substantially on the plane of line 6—6 of Fig. 5.

The spaced ends 6 of the chamber 7 (Fig. 2) have alined openings through which the screw 10 passes. Within the chamber 7 a nut, or partially interiorly threaded body 13 is located, the screw passing through a longitudinal opening therethrough. Said body or nut is of generally oval shape or outline in cross section as shown. Initially the nut is bored longitudinally and interiorly threaded with continuous threads complementary to the screw 10. The nut is then offset to one side a short distance and bored to substantially remove one-half of the threads cut, leaving what may be termed half-threads at 14 interiorly at one side, the opposite side being smooth and without threads, as at 15, and providing a longitudinal continuous opening through the body of the nut to one side of the threaded parts 14. The diameter of said opening 16 is in excess of the exterior diameter of the screw 10. When the nut 13 is moved relative to the screw 10 to the right (as in Fig. 3), it may be slid lengthwise through the opening 16 therefor, being out of engagement with the threads at 14. But on movement of the nut 13 relative to the screw 10 to the left (as in Fig. 4) the threads of the screw are engaged with the interior half threads 14 of the nut, and movement of the screw 10 longitudinally relative to the nut must be manually turning said screw in the proper direction.

Through a wall of the body of the nut 13 an opening is made disposed in said body opposite the curved side 9 of the recess 7. A cylindrical plug 17 is inserted in said opening freely passing thereinto and is preferably provided with a head at its outer end of a larger diameter than the remainder of the plug, which is partly received in a larger diameter recess therefor made at the outer end of the opening. Said plug at its outer end is pressed against by one end of a leaf spring 18 located outside and lengthwise of the nut 13 and fixed at its opposite end to said nut by a screw or other suitable fastening means. The inner end of the plug 17 is pressed against threads of the screw 10 by the yielding force of the spring 18.

With this construction with the screw 10 the nut 13 in the position shown in Fig. 3, in which position the screw may be moved bodily through the nut, on turning the screw in a clockwise direction, the nut will be turned to a position shown in Fig. 4 by reason of the pressure of the inner end of the plug engaged by the spring 18 against the threads of the screw 10, it being apparent that the screw diametrically opposite where the inner end of the plug presses against it will be pressed with equal pressure against the smooth interior 15, and with sufficient pressure to frictionally engage the screw with the nut so that the nut turns with the screw. Such turning of the nut with the screw will follow until the curved side of the nut at the right engages the curved inner side 9 of the recess 7, substantially at the point indicated at 20 in Fig. 4. Upon this occurring the nut will be stopped against further turning movement in a clockwise direction and, during the turning movement, the screw being held against lateral movement because of the openings through the ends 6 of the chamber 7, through which it passes, the nut will be moved bodily laterally and its interior threads 14 brought into meshing engagement with the exterior threads of the screw 10. Thereafter, with continued turning of the screw 10, clockwise, the engagement of its threads with the half threads 14 will move the screw lengthwise to move the head 11 toward the face at 3, and any material between them will be securely clamped and held.

On reverse turning movement of the screw 10, that is in a counterclockwise direction, the pressure of the plug 17 against the screw 10, and the transmitted pressure of the opposite side of the screw against the walls of the longitudinal passage through the nut will cause the nut to turn with the screw from the position shown in Fig. 4 to that in Fig. 3, and with a bodily movement of the nut to the right until at the point at 19 a side of the nut comes against the curved bottom 9 of the chamber 7. The nut will then have been moved so that its interior part threads 14 are disengaged from the exterior threads of the screw 10, whereupon said screw may be bodily moved lengthwise through the longitudinal opening at 16.

With such automatic quick action of screw structure, the screw 10 (Fig. 1) may be substantially instantly withdrawn the full distance, or until head 11 is brought against the inner vertical side 6 of the chamber 7 and any material placed between the head 11 and the face 3 is released.

The screw may be moved bodily inward lengthwise until the head comes against material to be clamped and then by turning the screw in a clockwise direction, engagement of the nut with the screw 10 threads 14 take place, and the clamping is accomplished with the force and pressure of any other screw clamp. Disengagement occurs by merely turning the screw 10 in the opposite direction with a substantially instant disconnection of the threads of the screw and nut, upon which the screw 10 may be moved longitudinally outward. The frictional effect produced by the spring actuated plug 17 does not interfere with turning the screw after its threads engage the half threads at 14.

The structure described is simple and practical, of great strength and durability, readily manufactured and assembled and with the operator either clamping or releasing from clamping performs by only the normal turning of the screw in the direction to clamp and unclamp; and not required to perform any manual operation by any different means for disconnecting the screw from the nut with which it cooperates.

The invention is defined in the appended claims and is to be considered comprehensive of all forms of structure coming within their scope.

I claim:

1. In a construction as described, a housing having spaced ends, said ends having alined openings therethrough, a screw threaded rod passing through said openings and through the housing, a member within the housing through which the rod passed, said member having an opening for the passage of the rod, a side of which is provided with cooperating part threads and the opposite side of which is smooth and located a sufficient distance from said threads at the rod may be passed freely longitudinally through said member when disengaged from its threads, and yielding means carried by said member pressing against the screw threaded rod to provide a frictional engagement thereof with said member causing the member to turn with said rod when the rod is turned, said member being so proportioned that at opposed sides thereof it engages cooperating inner portions of said housing when turned in either direction a predetermined distance, causing an engagement of the threads of said rod with the threads of the nut when turned in one direction and a disengagement therefrom when turned in the opposite direction.

2. In a construction of the class described, a housing having spaced sides and spaced ends providing a chamber, said ends of the housing having alined openings therethrough, a continuously screw threaded rod passing lengthwise of and through the chamber of said housing and through said openings in the ends thereof, a member disposed within said chamber having an opening through which the rod passes, said opening at one side thereof having a plurality of part threads adapted to mesh with the threads on the rod, said threads being of approximately half length and progressively diminishing to their ends, and said opening opposite said threads having smooth and unobstructed surfaces and having a diameter to permit free longitudinal movement of the threaded rod lengthwise of the member when disengaged from its threads, said member at its upper side having an opening therein, a plug passing through said opening bearing at its inner end against the screw threaded rod, yielding spring means pressing against the outer end of the plug, said member within the housing being laterally extended at each side of the opening therethrough so that one side of said member comes against an inner side of the chamber in the housing when turned in one direction a predetermined distance, preventing further turning thereof, and the other side of said member correspondingly engages against and is stopped by coming against an opposite inner side of said chamber in the housing when the member is turned in the opposite direction, said spring pressed plug causing frictional engagement of the threads of said rod with the sides of said opening through said member whereby it turns with the rod in either direction of movement when free to do so.

3. In a construction as described, a housing having spaced apart sides and spaced apart ends, said ends having alined rod passing openings therethrough, a screw threaded rod passing through said openings, said openings being of circular form and slightly larger in diameter than the exterior diameter of the screw threaded rod, control means for the rod located within the housing through which the rod passes, including a movable member, means for frictionally connecting said movable member and rod whereby said member turns with the rod when free to do so, interengaging means at opposed sides of the member and at opposed sides of said housing for preventing turning movement of said member with the rod beyond predetermined positions of said member with reference to the housing in either direction, and screw threaded means on said member engageable by the rod in one position of said member and disengaged from the threads of said rod in another position thereof.

4. In a construction as described, a housing having spaced apart vertical sides and spaced apart vertical ends providing a chamber within the housing, said bottom of the chamber being of arcuate form between the inner sides of the sides of said housing, a member located lengthwise of the chamber between the sides having a longitudinal opening therethrough, said opening at one side having a consecutive series of half threads and at the opposite side being smooth and unobstructed, a screw threaded rod passing through said chamber and through the opening in said member, the ends of said housing having circular openings for the passage of the rod of a diameter slightly in excess of the exterior diameter of the rod, and said opening through the member opposite said half threads having a size to freely permit longitudinal movement of the rod when its threads are disengaged from said half threads, said member within the chamber in lateral dimension being less than the distance between the inner sides thereof but such that one side of said member will engage with the curved bottom of the chamber within the housing on turning said rod in one direction a predetermined distance, and the opposite side engaged with the curved bottom of said chamber on turning the rod a preselected amount in the opposite direction, thereby causing an engagement of the threads of said rod with the half threads in the opening through said member when turned in one direction, and a disengagement therefrom when turned in the opposite direction, and yielding means carried by said member to press said rod into frictional engagement with the member to cause said member to turn with the rod when free to do so.

5. A clamp comprising a body having a housing, a clamping screw extending through said housing, a nut in said housing having a longitudinal opening through which said screw passes, said opening having an unthreaded portion of greater diameter than said screw and a merging portion having partial threads adapted to mesh with the threads of said screw, coacting means on said nut and said housing acting to move said nut laterally of said screw from one side to the other and reverse upon oscillation of said nut in said housing in opposite directions and a spring pressed plunger on said nut engaging with said screw tending to cause said nut to rotate with said screw.

LEO E. FARRELL.

REFERENCES CITED

The following references are of record in the file of this patent:

UNITED STATES PATENTS

| Number | Name | Date |
| --- | --- | --- |
| 1,140,646 | Abernathy | May 25, 1915 |
| 825,151 | McLean | July 3, 1906 |
| 298,704 | Norris | May 13, 1884 |
| 823,748 | Walden | June 19, 1906 |
| 947,619 | Orr | Jan. 25, 1910 |